United States Patent [19]
Miller

[11] Patent Number: 5,766,665
[45] Date of Patent: Jun. 16, 1998

[54] METHOD OF PREPARING A MULTI-FLAVORED COMESTIBLE SHAKE

[75] Inventor: Eric R. Miller, Deland, Fla.

[73] Assignee: Archibald Bros. Fine Beverages, Inc., Deland, Fla.

[21] Appl. No.: 451,256

[22] Filed: May 26, 1995

[51] Int. Cl.⁶ ..................................................... A23G 9/00
[52] U.S. Cl. .................... 426/565; 426/519; 426/569; 99/516; 222/144.5; 366/197; 366/198; 366/204; 366/347
[58] Field of Search .................... 222/144.5; 366/347, 366/197, 198, 204; 426/565, 569, 590, 519; 99/516

[56] References Cited

U.S. PATENT DOCUMENTS

| | | |
|---|---|---|
| 2,051,883 | 8/1936 | Morgan ........................ 366/197 |
| 2,737,274 | 2/1956 | Atkins . |
| 2,765,234 | 10/1956 | Schmitt et al. . |
| 3,276,633 | 10/1966 | Rahauser . |
| 3,460,717 | 8/1969 | Thomas . |
| 3,830,407 | 8/1974 | Wierlo . |
| 3,934,759 | 1/1976 | Giannella et al. . |
| 4,881,663 | 11/1989 | Seymour . |
| 5,056,686 | 10/1991 | Jarrett . |
| 5,323,691 | 6/1994 | Reese et al. . |
| 5,341,957 | 8/1994 | Sizemore . |

*Primary Examiner*—Lien Tran
*Attorney, Agent, or Firm*—Allen, Dyer, Doppelt, Milbrath & Gilchrist, P.A.

[57] ABSTRACT

A flavored shake drink is prepared from a prepackaged neutral flavored mix stored within a container. A flavored syrup is selected and dispensed through a bar gun styled dispenser in fluid communication with bag-in-box stored packages containing a variety of flavored syrups. A protective sleeve is placed within various size containers typically representing a small, medium and large size, wherein the sleeve permits blending within a standard fountain mixer and prevents the contents of the container from splashing onto the surrounding counter or on the container outside walls. In this way, the container used to store the prepackaged neutral mix and used to blend added ingredients is again used as the container holding the shake for the customer. The method provides a cost effective and health code conscience method for providing multi-flavored shakes.

20 Claims, 3 Drawing Sheets

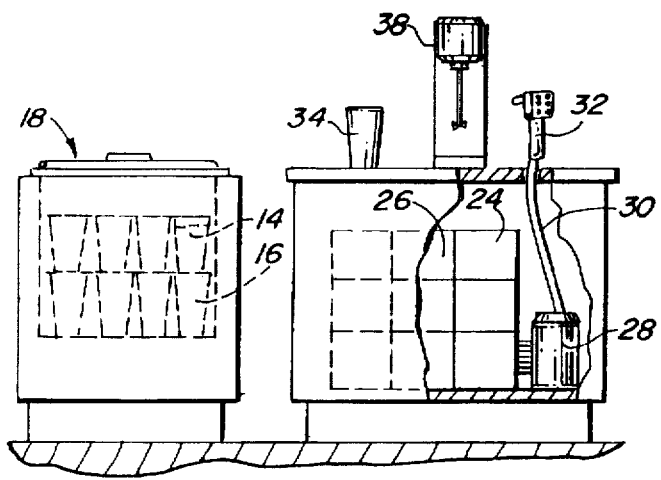
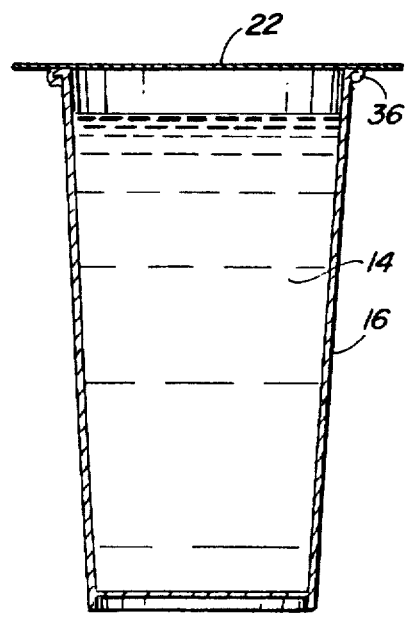
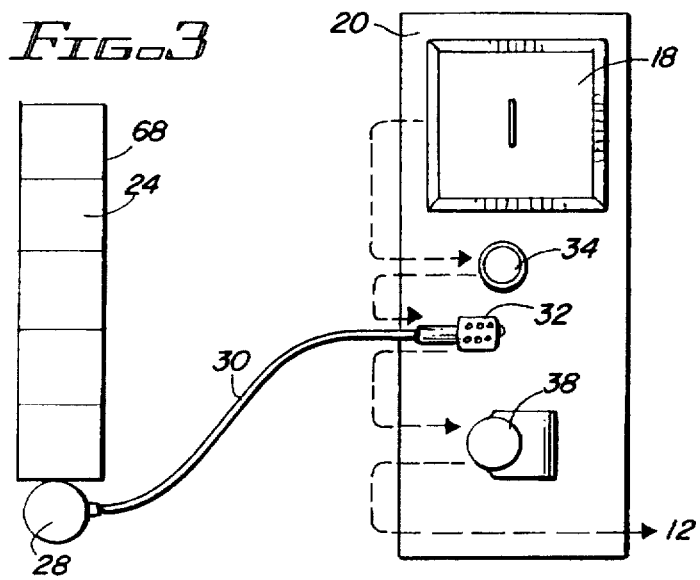
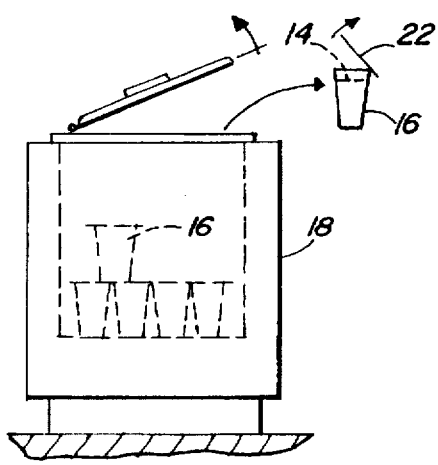
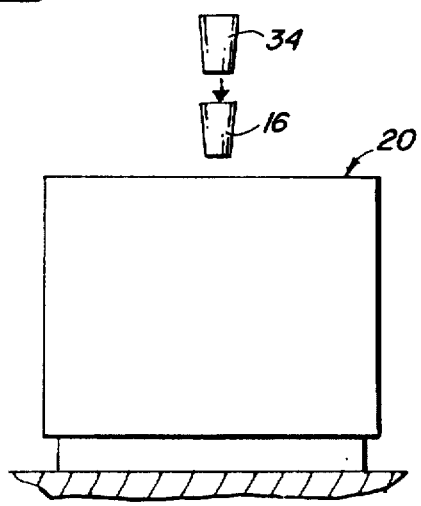

METHOD OF PREPARING A MULTI-FLAVORED COMESTIBLE SHAKE

BACKGROUND OF INVENTION

1. Field of Invention

The present invention relates generally to the dispensing and mixing of multi-flavored drinks such as milkshakes, frozen custards, slushes and the like, and more particularly to a health conscience and speedy method of storing, dispensing and mixing such products without requiring large storage facilities and costly equipment.

2. Background Art

Beverage dispensing systems are used to provide consumers with beverages that are typically a mixture of previously stored concentrate and water. Further, milk shake machines are available for use in fast-food styled restaurants, but such machines are typically expensive. In addition, storage of product used is typically within the machine thus demanding expensive retail space for placement and convenient use.

U.S. Pat. No. 5,056,686 to Jarrett discloses a beverage dispensing system for providing a number of different flavored drinks mixed from concentrate and water. The system has a number of containers for storing different flavors of concentrate and a piping system including a coupling adapted to receive pressurized water. Each container is in fluid communication with a specific fluid driven proportion pump that is also in fluid communication with the pumping system. Separate and fluid supply lines extend from each pump to a dispensing head. Valves in the dispensing head control the discharge of fluid therefrom so that when a selected beverage is desired, the appropriate concentrate and water are discharged simultaneously to ensure that the end beverage contains the appropriate mixture of concentrate and fluid.

U.S. Pat. No. 5,341,957 to Sizemore discloses a cup-type vending system which includes a vending machine having a currency output device and automatically outputs a beverage into a cup in response to an operator's payment and selection of a beverage. The vending machine includes a plurality of disposable containers of beverage syrup, such as "bag-in-box" packages, stored in an auxiliary cabinet. A dispensing system functions to draw syrup from the disposable containers and selectively dispense a predefined or selected amount of syrup into an awaiting cup. The system includes pumping stages wherein one stage draws a selected amount of syrup from a package through a feed conduit and discharges the selected amount through a nozzle into the cup.

U.S. Pat. No. 3,934,759 to Giannella et al. discloses a milk shake machine having a multiple mixing, blending and dispensing head for mixing and dispensing a variety of flavored milk shakes from one reservoir of unflavored comestible. Each head incorporates a premix chamber, wherein an unflavored, neutral comestible is injected under pressure, and is mixed under turbulence with a selected flavoring syrup which is also injected under pressure. A flexible shaft beater mixes the partially mixed comestible with the flavoring syrup and a triple port dispensing nozzle directs the mixed flavored milk shake into a container for serving.

U.S. Pat. No. 5,323,691 to Reese et al. discloses a frozen drink mixer for preparing blended beverages, particularly frozen drinks, in which an ice dispenser, liquid mix dispenser, and blender are combined into a single unit. The apparatus automatically delivers an appropriate amount of ice and liquid to the blender unit and turns on the blender at an appropriate time to prepare the frozen drink of desired size.

SUMMARY OF INVENTION

It is an object of the present invention to provide an efficient method of preparing a comestible drink, such as a milk-shake styled drink within health conscience standards. As is well known, strict sanitation codes and enforcement of these codes creates a need for improved and simplified food dispensing methods. It is further an object to provide a variety of flavors while minimizing storage and expanding accessibility for such flavors. It is further an object to use such flavors with a neutral flavored, pre-packaged shake mix for use as a base to which selected flavors are dispensed. It is yet another object of the invention to minimize inventory needs typical in the ice cream counter styled restaurant and improve on the speed of service for such a restaurant. It is yet another object to dispense such flavors through a bar-gun styled dispenser wherein a single or multiple flavors are added to the pre-packaged mix prior to blending. It is yet another object of the present invention to provide such a method at a cost well below that associated with current methods that include typically expensive storage and processing equipment. These and other objects of the invention will be apparent upon further review of the following specification and drawing.

The present invention discloses a method for preparing a comestible flavored shake which comprises the steps of providing a container that will be used to serve the shake to a customer, filling the container with a predetermined amount of a neutral flavored comestible mix, inserting a sleeve partially into the container, wherein the sleeve extends outward from the container for effectively extending walls of the container and thus preventing contents of the container from splashing out during blending of the mix. A flavored syrup is then added into the container and the mix and syrup are blended to form a flavored shake. The sleeve is removed from within the container for serving the flavored shake to a customer within the container.

In an alternate method for preparing multi-flavored shakes, steps include storing a multiplicity of varying flavored syrups within corresponding syrup packages and pumping the syrups from their corresponding packages to a bar gun-styled syrup dispenser in response to selecting a desired flavored syrup. A container used for serving a shake to a customer is filled with a predetermined amount of a neutral flavored shake mix. A desired flavored syrup is selected and added to the container for blending with the neutral flavored shake mix. The blended mix and syrup is thus formed into a flavored shake ready to be served within the container.

When it is desirable to have pre-packaged containers of neutral flavored mix, the container having the mix therein is sealed and stored in a food freezer until needed. When desired, the container is removed from the freezer and unsealed for accessing the mix.

BRIEF DESCRIPTION OF DRAWINGS

A preferred embodiment of the invention as well as alternate embodiments are described by way of example with reference to the accompanying drawings in which:

FIG. 1 is a functional elevation view of a combination of elements used within the inventive shake mixing method of the present invention;

FIG. 2 is a partial cross-sectional view of a container illustrating an embodiment of a sealing lid;

FIG. 3 is a schematic styled top view of the element combination of FIG. 1 illustrating method steps for an embodiment of the shake mixing method of the present invention;

FIG. 4 is a partial elevation view of a food freezer wherein pre-packaged shake mix is stored within the same container used in the storing, blending and serving steps of the preferred embodiment of the present invention;

FIG. 5 is a partial elevation view illustrating a sleeve inserting step of the present invention;

DETAILED DESCRIPTION OF REFERRED EMBODIMENT

Figure 11:
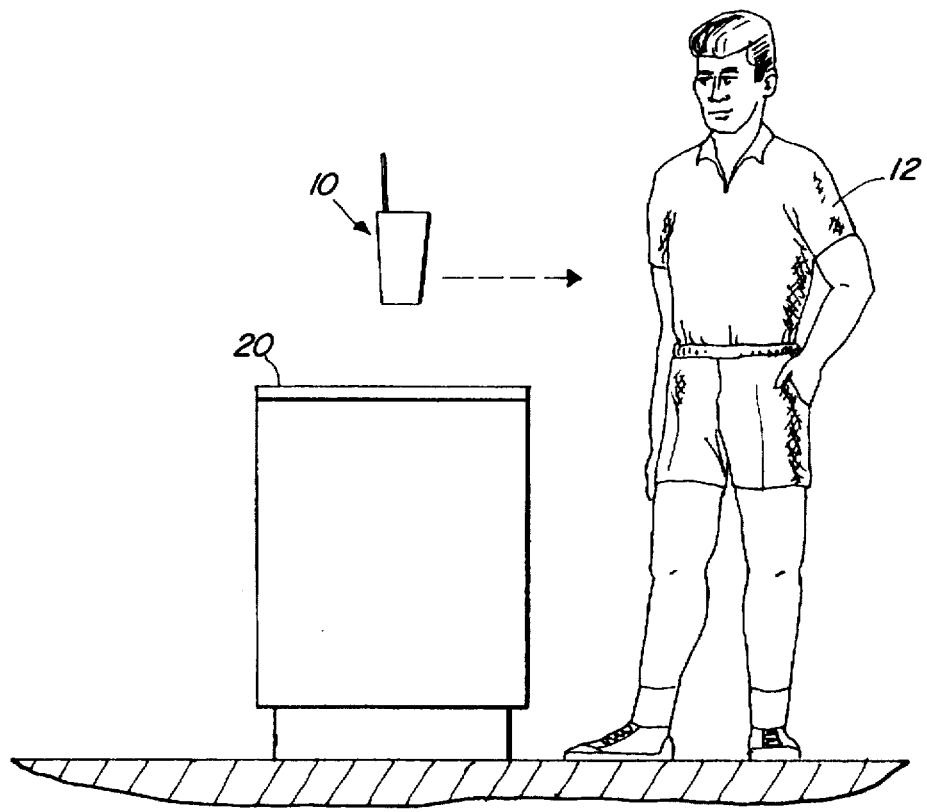
FIG. 11 is a partial elevation view illustrating a step of the present invention.

A preferred method of the present invention is illustrated with reference to enclosed drawings in which FIG. 1 schematically illustrates elements used in a method for preparing a multi-flavored shake 10 to a waiting customer 12 as illustrated with reference to FIG. 11, a step in the method and an object of the present invention. In the preferred embodiment, a neutral flavored shake mix 14 is prepared, pre-packaged or stored in a cup or container 16, and delivered to an ice cream shop or restaurant for storage in a food freezer 18 conveniently accessed by a food service person or server. Typically, such a freezer 18 is conveniently located near to the shake preparation area such as a counter 20. It is anticipated that a multiplicity of pre-packaged containers 16 having such a mix 14 will be stored within the freezer 18 as is typical done for freezers holding various flavors of ice cream. Further, the container is sealed with a lid 22 prior to storage in the freezer 18. With such an arrangement, handling the mix 14 at the restaurant is done within strict health code standards and with little fear of contaminating the pre-packaged mix 14.

It is anticipated, as is illustrated with reference to FIG. 2, that a flexible foil styled lid 22 will be sealed along the container rim or mouth 36. The lid 22, in such an embodiment extend beyond the rim 36 for ease in handling the lid 22 for peeling from the container 16 and disposal.

Multiple bag-in-box styled packages 24 are used to store various flavored syrups 26. The syrups are individually pumped through dedicated pumps 28 and conduit 30 to a bar gun styled dispenser 32 for selecting a desired syrup for adding to the container 16 and blending with the mix 14. As is typical on bar guns, selector buttons (not shown) provide for the selection of a desired syrup to be dispensed from the dispenser 32 after delivery from an appropriate package 24 having the desired syrup 26.

As illustrated with reference to FIG. 4, one container 16, having the neutral shake mix 14 therein and a lid 22 thereon for providing an airtight seal of the mix 14, is taken from its storage place in the freezer 18. The lid 22 is removed and disposed of in the preferred method to further meet cleanliness and efficiency objects of the present invention. As illustrated with reference to FIG. 5, a protective tubular sleeve 34 is inserted into the container 16. The sleeve 34 enters at least partially into the container 16 and is held in place by container side walls.

Figure 6:
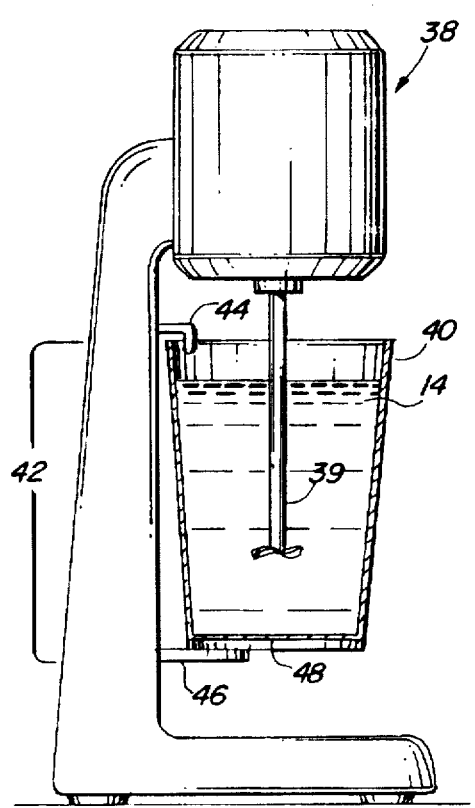
FIG. 6 is a typical shake mixer found in the prior art.

As illustrated with reference to FIG. 6, it is well known in the soda fountain art to use a mixer 38 that includes a mixing cup 40, typically made of metal for preparing the shake. Once prepared, the flavored shake in then poured into a serving cup. Often, excess mixed shake is prepared only to be wasted because the size shake ordered does not accommodate the amount of shake prepared. Further, the typical mixer 38 has a preset height dimension 42, so that a switch 44 can be activated for the blending process, while the mixing cup 40 is held between the switch 44 and a hook 46 upon which a bottom portion 48 of the cup 40 is placed.

As illustrated with reference to FIGS. 7 and 8, the tubular sleeve 34 having open ends is dimensioned for passing into the container 16. Depending on the container opening 50, and the taper within the container walls 52, the sleeve 34 will rest against the cup inner wall surface 54 as illustrated with a cylindrical, parallel walled sleeve 34a of FIG. 7.

Figure 8:
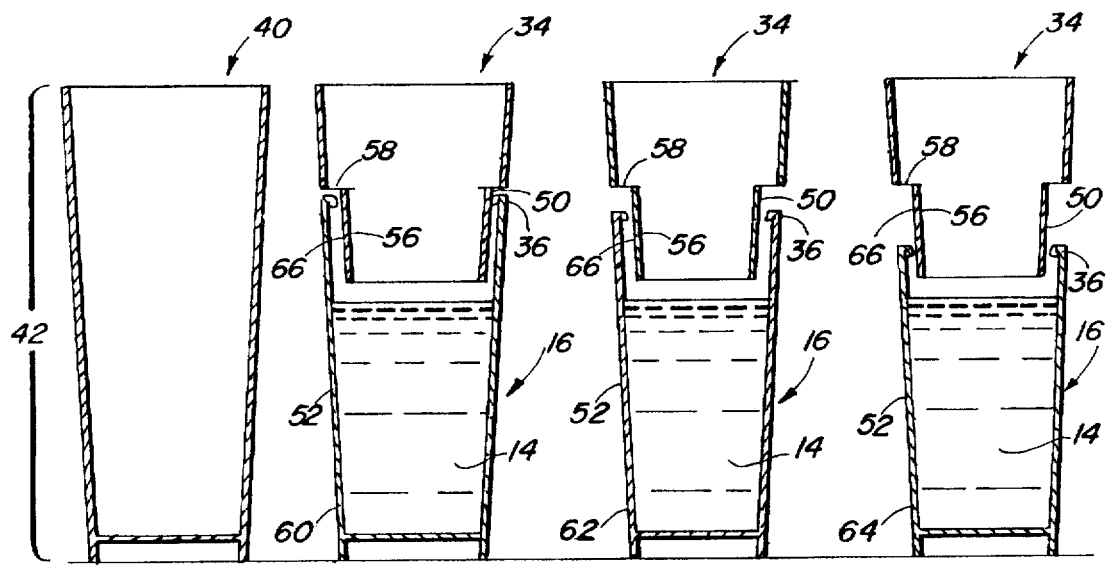
FIG. 8 illustrates a preferred embodiment of a sleeve used in the present invention.

With reference to FIG. 8, in the preferred embodiment of the present invention, the sleeve 34 has a taper wall 56 as illustrated with reference to FIG. 8. In this way, parallel walled containers and the typical tapered wall fountain cups are easily used with the sleeve 34. Further, in one embodiment of the sleeve 34, the sleeve 34 includes a step 58 for receiving a container rim 36 as illustrated with reference to the large shake cup 60. For typical medium 62 and small 64 cups, the sleeve tapered wall portion 66 contacts the respective rims 36 wherein the sleeve 34 is held in position for the blending step. The sleeve 34 extends sufficiently above the cup rim 36 to prevent splashing mix from dirtying the cup outside wall surface of the surrounding counter where the shake is being prepared. In addition, the preferred embodiment of the present invention includes the use of a sleeve 34 using a taper and step combination that provides a height dimension 42 such that the combination of sleeve 34 and cup 60, 62, 64, can be used in a standard manner with the well known mixer 38 as described earlier with reference to FIG. 6.

Figure 9:
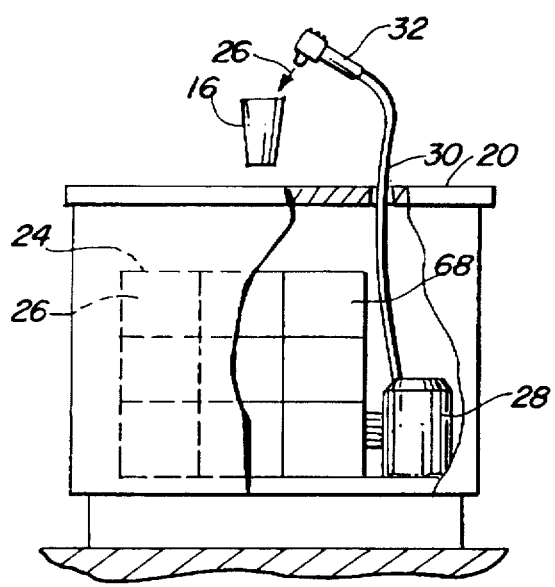
FIG. 9 is a functional elevation view illustrating bag-in-box syrup storage and flavor selection using a bar-gun styled syrup dispenser in method steps of the present invention.
Figure 10:
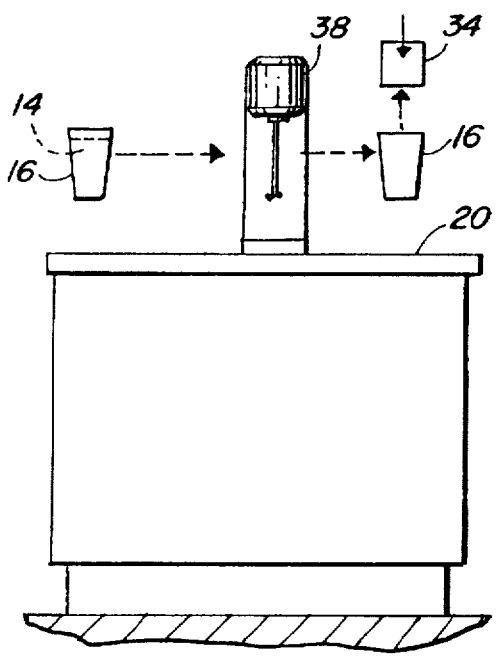
FIG. 10 is a partial elevation view illustrating functional step of the method of the present invention.

As illustrated with reference to FIG. 9 and again to FIG. 1, the preferred embodiment of the present invention anticipates the storing of a multiplicity of packages 24 in a bag-in-box styled package and storage configuration 68. The contents, a variety of flavored syrups 26, of each package 24 is in fluid communication with the dispenser 32, a bar gun styled dispenser typically used to select and dispense liquor drinks and mixed soda drinks in combination with a preset amount of injected water. Once a particular flavored syrup 26 has been identified, an appropriate button on the dispenser 32 is pushed which causes a pump dedicated to that syrup 26 to pump the syrup 26 from its individual package 24 through conduit 30 in fluid communication with its individual pump 28. Typically one push of the dispense button insects a preset amount of syrup, two button pushes injects a doubled amount. In this way, customized, multi-flavored shake ingredients are readied for blending into the shake of choice. Further, a combination of flavors can be injected into the container depending on the needs of customer.

Figure 7:
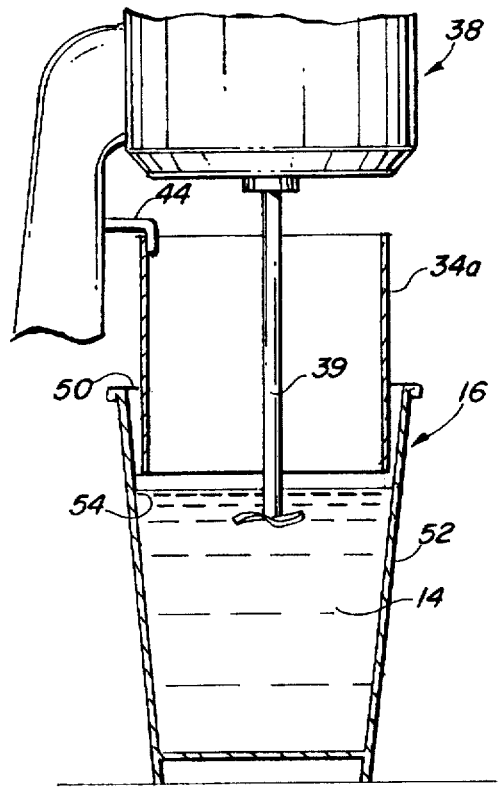
FIG. 7 is a partial cross-sectional view of a cylindrical sleeve in combination with a cup having a tapered side wall showing in use with a mixer.

As illustrated by way of example with reference to FIG.7, with the sleeve 34 placed within the appropriate container 16, the container 16 and sleeve 34 combination is then positioned for permitting a mixing blade shaft 39 of the mixer to be inserted into the container 16 through the sleeve 34 for blending of the ingredients. It is anticipated that cups 60, 62, and 64 typically used will have 20,16 and 12 ounce capacities often used to serve milk shakes. Once the blending is complete, the sleeve 34 and container 16 combination is removed from the mixer 38. The sleeve 34 is removed and the container 16 now having the desired flavored shake is served to the customer 12, as illustrated with reference to FIG. 11. In the preferred embodiment of the present invention, the sleeve 34 is washed for reuse.

With such a method, a cost effective, health code conscience method of providing a desired flavored shake is provided. While specific method steps of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful methods and reasonable equivalents thereof obvious to those skilled in the art, are set forth in the appended claims.

What is claimed is:

1. A method for preparing a comestible flavored shake comprising the steps of:

providing a container having an opening, filling the container with a predetermined amount of a neutral flavored shake mix leaving exposed upper interior sidewall portions of the container;

inserting an open-ended tubular sleeve through the opening of the container, the open-ended tubular sleeve passing at least partially into the container so as to be positioned adjacent the exposed upper interior sidewall portions of the container thus extending walls of the container;

dispensing a flavored syrup into the container for blending with the mix;

blending the mix with the flavored syrup for forming a flavored shake, the blending causing splashing onto an interior of the tubular sleeve while the sleeve prevents the splashing onto the exposed upper interior sidewall portions of the container;

removing the open-ended tubular sleeve from within the container; and serving the flavored shake within the container.

2. The method as recited in claim 1, wherein the container filling step further comprises the steps of:

sealing the mix within the container;

storing the container in a food freezer;

removing the container from the freezer; and unsealing the container for accessing the mix.

3. The method as recited in claim 1, wherein the mix is selected from the group consisting of vanilla ice cream, vanilla soft serve ice cream, unflavored shake mix, and prepackaged neutral flavored mix.

4. The method as recited in claim 1, wherein the container comprises a cup having a generally cylindrical side wall and the sleeve comprises a generally cylindrical tube having a tapered side wall, the tapered wall communicating with a cup mouth and side wall for limiting penetration of the sleeve into the cup, the sleeve further extending outward from the cup mouth a preset distance, the distance providing a height combination of cup and sleeve for communicating with a mixer used in the blending step.

5. The method as recited in claim 1, wherein the sleeve further comprises a stepped side wall for communicating with a container opening in one of a multiplicity of containers having varying preset capacities, each step of the sleeve wall dimensioned for positioning along a corresponding opening of one capacity container.

6. The method as recited in claim 2, wherein the sealing step comprises removably attaching a flexible lid across an opening of the container for providing an airtight seal over the opening, the attaching sufficient for sealing the mix within the container yet sufficient for permitting full removal of the lid.

7. The method as recited in claim 1, further comprising the steps of:

storing a multiplicity of syrup packages, each package having a preselected flavored syrup;

providing conduit means for dispensing a selected syrup from its corresponding package to a dispenser; and providing a bar gun styled dispenser for adding the preselected syrup into the container.

8. A method for preparing multiple flavored shakes comprising the steps of:

storing a multiplicity of varying flavored syrups within corresponding syrup packages;

dispensing the syrups from their corresponding packages to a bar gun styled syrup dispenser in response to selecting a desired flavored syrup;

providing a container for serving a shake to a customer;

filling the container with a predetermined amount of a neutral flavored shake mix;

selecting a desired flavored syrup for adding to the container;

dispensing the desired flavored syrup from the gun styled syrup dispenser to the container for mixing with the neutral flavored shake mix;

blending the selected syrup with the shake mix for forming a flavored shake; and serving the container having the flavored shake to the customer.

9. The method as recited in claim 8, further comprising the steps of:

inserting an open-ended tubular sleeve partially into the container, the sleeve extending outward from the container thereby extending walls of the container for preventing contents of the container from splashing onto surrounding work surfaces; and removing the open-ended tubular sleeve from within the container for serving the flavored shake within the container.

10. The method as recited in claim 8, further comprising the steps of:

sealing the container after the filling step for providing airtight storage of the mix therein;

freezing the mix by storing the container in a food freezer;

removing the container from the freezer for adding a desired flavor, the container having the frozen neutral flavored mix; and unsealing the container for the flavor dispensing step.

11. The method as recited in claim 8, wherein the container providing step further comprises the step of providing a multiplicity of container sets, each set having a preset container capacity for holding a predetermined amount of shake mix.

12. The method as recited in claim 8, wherein the syrup packages are further stored in a bag-in-box style at a location removed from a blending step location, the dispensing step providing sufficient fluid conduit for communicating between the removed syrup storage location and the blending location for completing the syrup adding step.

13. The method as recited in claim 8, wherein the blending step comprises the step of holding the container for inserting a mixing blade thereon for sufficiently blending the dispensed flavor with the neutral flavored mix thus forming the flavored shake.

14. A method for preparing a flavored shake for serving a customer, the method comprising the steps of:

provding a container for serving a shake to a customer, the container having an opening for access into the container;

filling the container with a predetermined amount of a neutral flavored shake mix;

sealing the container opening for providing airtight storage of the mix therein;

storing the container in a food freezer;

removing the container from the freezer;

unsealing the container for accessing the shake mix;

inserting an open-ended tubular sleeve through the opening, the sleeve passing at least partially into the container, the open-ended tubular sleeve extending outward from the container thereby extending walls of the container for preventing contents of the container from splashing out of the container during mixing of the shake mix;

storing a multiplicity of flavored syrups within corresponding packages;

accessing the packages for dispensing a selected syrup from an appropriate package in response to a selected desired flavored syrup;

dispensing the selected syrup into the neutral flavored mix for blending with the neutral flavored shake mix thus providing a flavored shake desired by the customer;

inserting a mixer blade into the container for blending the flavored syrup with the neutral flavored mix;

blending the flavored syrup with the neutral flavored shake mix for forming a flavored shake;

removing the mixer blade from the container;

removing the open-ended tubular sleeve from the container for serving the container including the flavored shake to a customer; and serving the container having the flavored shake to the customer.

15. The method as recited in claim 14, wherein the container providing step further includes the step of providing a multiplicity of containers, the containers of varying sizes for holding preselected quantities of shake mix.

16. The method as recited in claim 15, wherein the sleeve is dimensioned for insertion into any one of the varying size containers, the sleeve further having a width dimension for limiting access into the container to a location wherein a height dimension of the container and sleeve in combination is constant for a combination of container and sleeve, the height dimension sufficient for communicating with a shake mixer dimensioned for receiving a container having the height dimension, the mixer for performing the blending step.

17. The method as recited in claim 14, wherein the filling step comprises substantially filling the container such that a level of the neutral flavored mix is distant from the opening.

18. The method as recited in claim 14, wherein the sealing step comprises attaching a removable flexible lid across the opening for providing an airtight seal with the opening, the attaching sufficient for sealing the mix within the container.

19. The method as recited in claim 14, wherein the syrup storing step further comprises the step of storing the syrup packages at a location removed from a serving location.

20. The method as recited in claim 14, wherein the dispensing step further comprises the steps of:

providing a flavor syrup gun for selecting a flavored syrup, the flavor syrup gun communicating with the flavored syrup packages for dispensing a selected syrup through a gun nozzle;

selecting a desired flavored syrup by depressing one of a multiplicity of triggers of the flavor syrup gun, each trigger corresponding to the flavor provided; thus dispensing the selected flavored syrup from its stored position.

* * * * *